(12) United States Patent
Jacobson

(10) Patent No.: US 7,228,375 B1
(45) Date of Patent: Jun. 5, 2007

(54) SYSTEM AND METHOD FOR EFFICIENT INPUT/OUTPUT OF A COMPUTER SYSTEM

(75) Inventor: Van Jacobson, Woodside, CA (US)

(73) Assignee: SLT Logic, LLC, Boston, MA (US)

( * ) Notice: Subject to any disclaimer, the term of this patent is extended or adjusted under 35 U.S.C. 154(b) by 828 days.

(21) Appl. No.: 10/042,971

(22) Filed: Jan. 7, 2002

Related U.S. Application Data

(60) Provisional application No. 60/261,598, filed on Jan. 12, 2001, provisional application No. 60/261,599, filed on Jan. 12, 2001.

(51) Int. Cl.
*G06F 13/00* (2006.01)
*G06F 13/24* (2006.01)

(52) U.S. Cl. .......................... 710/317; 710/6; 710/310; 370/235

(58) Field of Classification Search ................ 370/235, 370/392, 394, 414, 395.21, 429; 710/26, 710/30, 305, 317; 709/235, 253, 251; 348/14.07; 711/118, 206; 713/150
See application file for complete search history.

(56) References Cited

U.S. PATENT DOCUMENTS

| | | | | |
|---|---|---|---|---|
| 4,884,192 A * | 11/1989 | Terada et al. ................ 709/251 |
| 5,369,749 A | 11/1994 | Baker et al. |
| 5,406,322 A * | 4/1995 | Port et al. ................. 348/14.07 |
| 5,485,626 A | 1/1996 | Lawlor et al. |
| 5,940,870 A * | 8/1999 | Chi et al. ................... 711/206 |
| 6,094,435 A * | 7/2000 | Hoffman et al. ............ 370/414 |
| 6,253,250 B1 * | 6/2001 | Evans et al. ................ 709/253 |
| 6,265,885 B1 * | 7/2001 | Luo et al. ................... 324/719 |
| 6,345,041 B1 * | 2/2002 | Kimball et al. ............. 370/235 |
| 6,434,153 B1 * | 8/2002 | Yazaki et al. .......... 370/395.21 |
| 6,438,651 B1 * | 8/2002 | Slane ......................... 711/118 |
| 6,453,366 B1 * | 9/2002 | Broberg et al. ............... 710/26 |
| 6,484,224 B1 * | 11/2002 | Robins et al. ............. 710/305 |
| 6,650,640 B1 * | 11/2003 | Muller et al. ............... 370/392 |
| 6,651,131 B1 * | 11/2003 | Chong et al. ............... 710/317 |
| 6,728,256 B1 * | 4/2004 | Henrion ...................... 370/429 |
| 6,738,821 B1 * | 5/2004 | Wilson et al. ............. 709/230 |
| 6,754,819 B1 * | 6/2004 | Wootten et al. ............ 713/150 |
| 6,862,282 B1 * | 3/2005 | Oden ......................... 370/394 |
| 6,862,292 B1 * | 3/2005 | Bass et al. .................. 370/414 |
| 6,928,482 B1 * | 8/2005 | Ben Nun et al. ........... 709/235 |
| 2003/0177292 A1 * | 9/2003 | Smirnov et al. ............. 710/30 |

FOREIGN PATENT DOCUMENTS

JP        08-340348        * 12/1996

* cited by examiner

*Primary Examiner*—Christopher E. Lee
(74) *Attorney, Agent, or Firm*—Patterson, Thuente, Skaar & Christensen, P.A.

(57) ABSTRACT

A system and method allows input/output to and from a computer system via the memory bus of a computer system. Input is accepted directly into shared memory or other memory and assigned to a processor or other entity. A processor or other entity may retrieve the input assigned to it and process the input. Output is written by the system processors to private memory, then retrieved from private memory by the system and method and output, for example to a network. Inputs and outputs are written to and from memory without using the I/O buses of the computer system and without generating interrupts to the system processors.

33 Claims, 6 Drawing Sheets

SYSTEM AND METHOD FOR EFFICIENT INPUT/OUTPUT OF A COMPUTER SYSTEM

RELATED APPLICATIONS

This application claims the benefit of application Ser. No. 60/261,598, entitled "Method and Apparatus for Efficient Input/Output of a computer system filed on Jan. 12, 2001 by Van Jacobson, and is related to the subject matter of application Ser. No. 60/261,599 entitled, "SYSTEM AND METHOD FOR OFFLOADING RESPONSES TO NETWORK COMMUNICATIONS" filed on Jan. 12, 2001 by Van Jacobson, and each is incorporated herein by reference in its entirety.

FIELD OF THE INVENTION

The present invention is related to computer hardware and software and more specifically to computer hardware and software for input/output interfaces.

BACKGROUND OF THE INVENTION

Computer systems use conventional input/output subsystems to allow a computer system containing one or more processors to communicate with external systems. However, there are several problems with conventional input/output subsystems.

One problem of conventional input/output subsystems is the use of interrupts. Because conventional input/output subsystems must communicate with external systems operating independently of the computer system in which they operate, some conventional input/output subsystems employ interrupts to notify the processor of the computer system when an input has arrived or when an output has been sent. When a conventional input/output subsystem receives a communication from the external system, the conventional input/output subsystem generates an interrupt to inform a processor that a communication has been received and is waiting to be serviced. If the processor provides output it may also receive an interrupt by the input/output system to let the processor know that the output has been sent. Interrupts decrease the efficiency of a conventional computer system because the computer system must save its state to handle the interrupt, then restore the state after the interrupt has been handled. Conventional computer systems used interrupts because they allowed a processor to perform other work in between handling the interrupts. Because the I/O used only a small portion of the processor's throughput, interrupts offered a more efficient mechanism for processing I/O than conventional polling techniques. However, in modern multiprocessor systems in which the I/O consumes a more significant portion of processor resources, the benefits of using interrupts can be outweighed by the overhead required.

Another problem with conventional I/O subsystems is the lack of speed of conventional I/O busses. I/O bus speeds in conventional computer systems have not kept pace with the increases in modern processor speeds, and thus, many computer systems are constrained by the speed of the I/O bus. If the computer system is operating as a server, such as a web server or a file server, the bottleneck at the I/O bus may leave the processors idle while the I/O is being sent or received.

To avoid the bottleneck of the I/O subsystem, some computer systems have employed direct memory access techniques. Direct memory access allows the I/O subsystem to access the same memory facilities being used by the one or more processors of the computer system. The processor or processors place the data to be transferred into the memory, and instruct the DMA subsystem to transfer the data to an external system. Data received by an external system is sent by the DMA subsystem to the memory. Interrupts are used to inform the processor that the DMA subsystem has received data from the external system and also to inform the processor that the data has been sent to the external system. Although the use of DMA reduces the number of interrupts, interrupts are still used with DMA subsystems. Furthermore, data transfers are made from the external system to the DMA subsystem using the I/O bus. In addition, the memory bus throughput is reduced because all data transfers require two uses of the memory bus: once to put the data into memory and once to remove it. Furthermore, DMA circuitry requires memory data bus contention control systems because both the processor and the DMA subsystem can access the memory data bus at the same time.

Another problem associated with using the memory facilities of a computer system for I/O processing is that the responses to the I/O requests in modern server systems could simply overwhelm any one memory bus. While many I/O requests such as disk I/O requests or requests for web pages are relatively small, the response to the request is often large compared to the request: it may contain an entire file or a web page. Using the memory facilities of the computer system to process I/O could overwhelm the memory bus while the response to the request is being transmitted.

Because many computer systems utilize several processors, and because certain requests for information may be distributed across several messages, it can be most efficient to provide all of the messages in a request to the same processor that handled any prior message in a request. Some I/O subsystems employ complicated interprocess communication techniques in order to route such messages to the proper processor. The overhead required for these techniques can reduce the throughput of the processors handling the messages.

What is needed is a system and method that has a data rate exceeding conventional I/O bus speeds, does not employ interrupts, will not overwhelm the memory facilities of a computer system in which it is employed, and can efficiently route messages to an appropriate processor in a multiple processor computer system.

SUMMARY OF INVENTION

A system and method accepts communications directly into the addressable main memory of the computer system, bypassing the memory bus, while allowing retrieval at memory speeds. A pointer to the communication in memory is queued to allow processors to retrieve the communication without the use of interrupts. Each communication may be queued for a specific processor or other entity, such as the processor that handled the last communication from the same source and to the same destination that had the same protocol as the communication. When the processor or other entity processes the communication, it may provide a response or other communication into the addressable memory of the computer system. The system and method retrieves the response or other communication directly from the memory and provides it as output, for example, to a network. If multiple processors have access to shared memory and also have access to their own private memory, the first communication may be accepted into shared memory and the response or other communication may be stored into private memory for the processor processing the communication, spreading the various communications across different memory buses. In the case in which the first communication is relatively small, such as a request for information, and the response or other communication is large, such as the information requested being a web page or a file from a storage device, processing all of the requests via a shared memory bus and the responses via private memory busses of multiple processors exploits the asymmetry of the communications, to provide a throughput larger than would be possible using a single bus without overwhelming any of the memory buses.

DETAILED DESCRIPTION OF A PREFERRED EMBODIMENT

A. Computer Architectures.

Figure 1A:
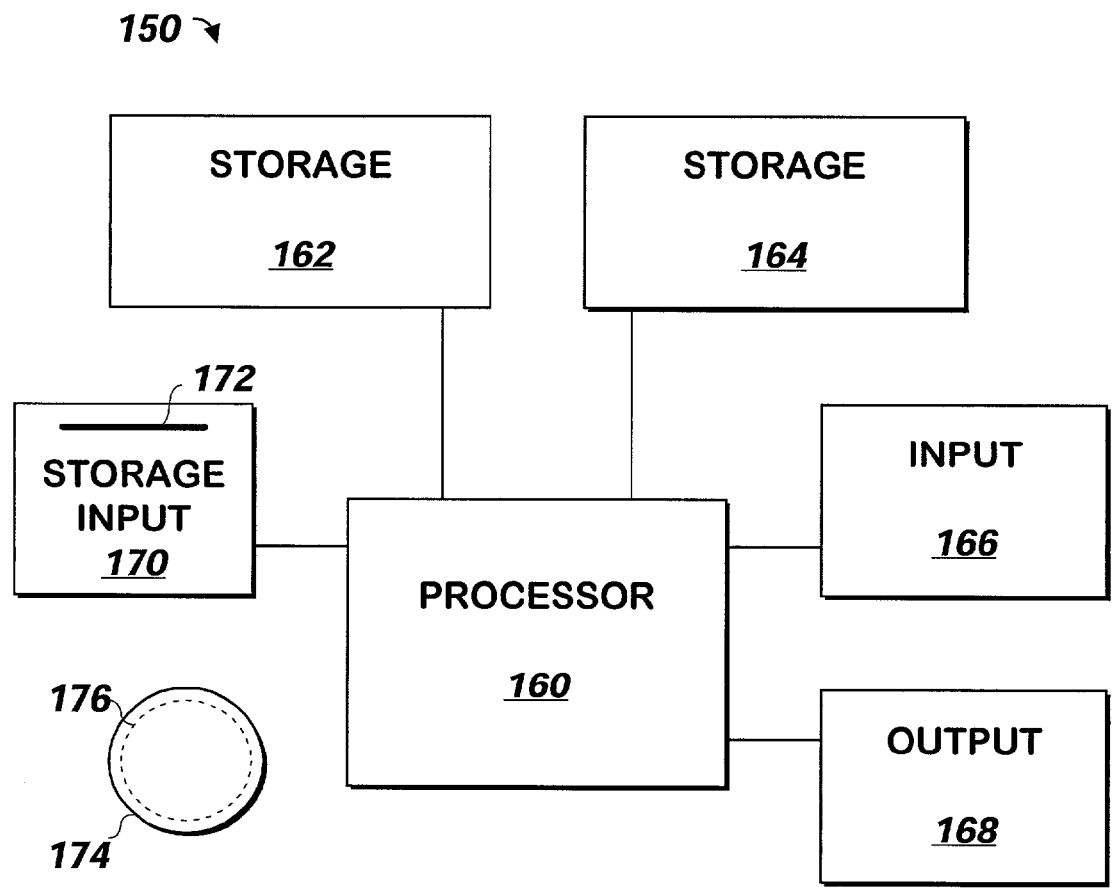
FIG. 1A is a block schematic diagram of a conventional computer system.

The present invention may be implemented at least in part as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 178, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running the Windows (95, 98 or NT) operating system commercially available from Microsoft Corporation of Redmond Wash. or a Macintosh computer system running the MacOS commercially available from Apple Computer Corporation of Cupertino, Calif. and the Netscape browser commercially available from Netscape Computer Corporation of Mountain View, Calif. although other systems may be used.

Figure 1B:
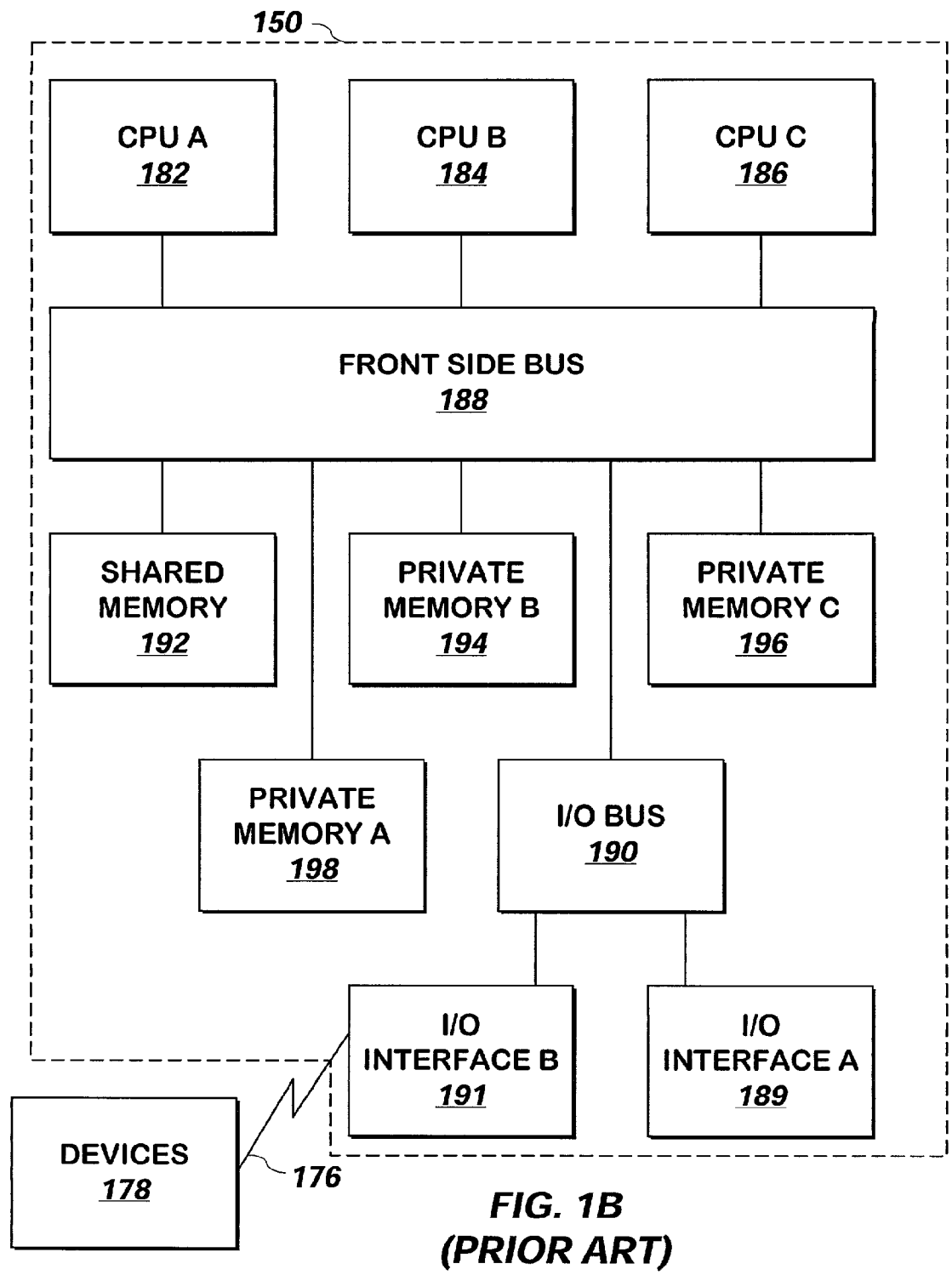
FIG. 1B is a block schematic diagram of a conventional computer system.

Referring now to FIG. 1B, another aspect of an architecture of a conventional computer system 150 is described according to one embodiment of the present invention. CPU A 182, CPU B 184 and CPU C 186 are conventional microprocessors such as the conventional Ultrasparc II, Ultrasparc III or MAJC microprocessor commercially available from Sun Microsystems, Inc. of Palo Alto, Calif. Each of the CPUs 182–186 is coupled to a conventional memory bus 188 such as the conventional Front Side Bus specified by Intel Corporation of Santa Clara, Calif. Each of the CPU's has access to two types of memory via the front side bus 188. Shared memory 192 is available to all CPUs 182–186 via a commonly shared main memory bus. Private memory A 198 is available to CPU A 182 via a separate main memory bus, but not CPU B 184 and CPU C 186. Private memory B 194 is similarly available to CPU B 184 via a separate main memory bus, but not the other CPUs 182, 186. Private memory C 196 is similarly available to CPU C 186 via a separate main memory bus, but not the other CPUs 182, 184. I/O bus 190 is available to the CPUs 182–186 and coupled to interrupt driven I/O interfaces 189, 191 such as conventional ISA or PCI interfaces.

In one embodiment, the systems that make up elements 189 and 191–198 may each be made of any number of physical devices such as memory or interface cards, or may be combined onto a smaller number of such physical systems. In one embodiment, I/O interface B 191 may include one or more communication interfaces such as conventional TCP/IP-compatible communication interface cards that are capable of communicating with one or more external devices 178 via a conventional network 176 such as an Ethernet or the Internet. Devices 178 may be conventional computer systems or disk drives or any other device that may wish to communicate with computer system 150.

The present invention may be used with any system architecture and not just the architecture shown in FIG. 1B, however that architecture will be used for purposes of example. As an overview of the system, the present invention can include one or more cards that have two sets of interfaces. The first set of interfaces are memory interfaces which appear to CPUs 182–186 as if they are conventional memory devices 192–198. The present invention may be used in addition to conventional memory systems 192–198. The second set of interfaces are interfaces to devices 178, such interfaces acting like conventional I/O interfaces.

B. Receiving Input.

Figure 2A:
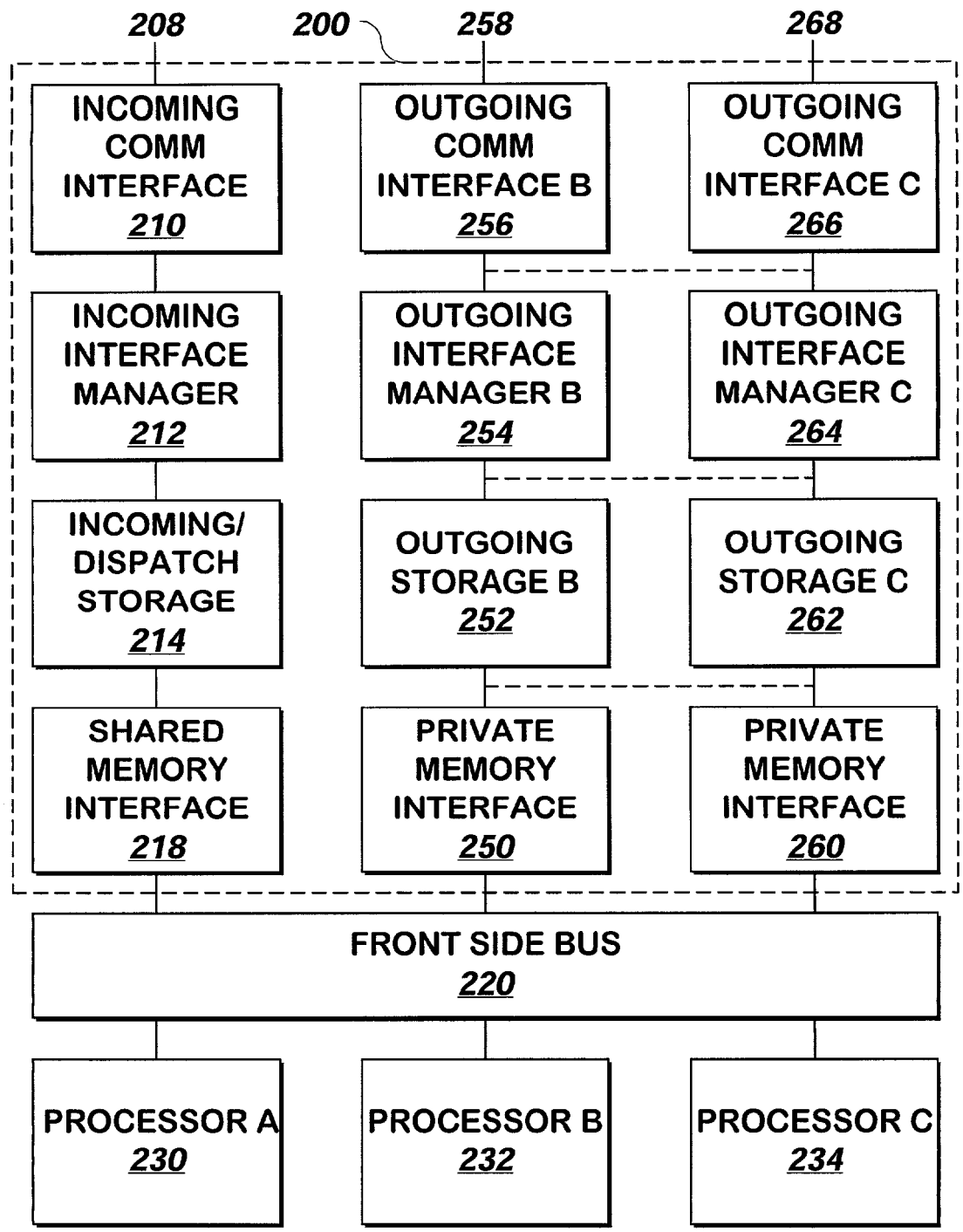
FIG. 2A is a block schematic diagram of a system for communicating with systems external to a computer system according to one embodiment of the present invention.

Referring now to FIG. 2A, a system for communicating with systems external to a computer system is shown according to one embodiment of the present invention. Incoming communication interface 210 is a conventional communication interface for communicating with devices coupled to input 208, such devices being external to the computer system containing incoming communication interface 210. In one embodiment, input 208 is coupled to the output of a device that intercepts and responds to syn packets and forwards other packets to its output (coupled to input 208) as described in the copending application, described above.

Incoming communication interface 210 may include a conventional TCP/IP-compatible communication interface, a conventional Ethernet interface, any other form of communication interface capable of communicating with a storage device such as a disk drive or tape drive or any other form of interface. Incoming communication interface 210 passes a portion or all of each such communication received to incoming interface manager 212.

Incoming interface manager 212 receives incoming communications and stores a portion or all of each of them into incoming/dispatch storage 214 as described in more detail below. As described in more detail below, in one embodiment, incoming/dispatch storage 214 contains conventional storage such as memory or disk storage which may be arranged as a circular buffer, with pointers to the head and tail of the buffer.

Incoming communication interface 210 thus stores the some or all of the communication into incoming/dispatch storage 214 "directly". As used herein, to store something "directly" means to store it into a storage location accessible to at least one processor via a main memory bus of the computer system, but where such storage is performed without the use of any system I/O bus.

In one embodiment, incoming/dispatch storage 214 contains conventional 2 port or multiport RAMs such as those commercially available from Cypress Semiconductor of San Jose, Calif.: one port is coupled to incoming communication interface 210 and the other port is coupled to the main shared memory bus of the computer system. This allows incoming communication interface 210 to store some or all of the communication "sinebusly", that is, without the use of a system memory bus, such as the main memory bus used by processors 230–234.

The storage is also performed "sineinterruptusly." As used herein, "sineinterruptusly" means without causing an interrupt to be generated to a main processor of the computer system. A main processor of the computer system is a processor that is under control of the operating system of the computer system, as opposed to processors dedicated to I/O functions which may reside on interface cards or peripherals and operate somewhat independently of the operating system.

Shared memory interface 218 is a conventional memory interface that may be coupled to a conventional memory bus such as a front side bus interface and allows shared memory access in one embodiment, or private memory access in another embodiment. In one embodiment, shared memory interface 218 includes a capability to allow one or more system processors to read one communication of the contents of a buffer in incoming/dispatch storage 214 at the location pointed to by a pointer to one of the FIFOs in incoming/dispatch storage 214 described in more detail below, and then updates the head pointer to point to the memory location immediately following the communication in incoming/dispatch storage 214. In another embodiment, shared memory interface 218 allows one or more system processors to read the pointers or the contents of the buffer in incoming/dispatch storage 214 so that, for example, the device can handle the details of updating the head pointer.

Figure 2B:
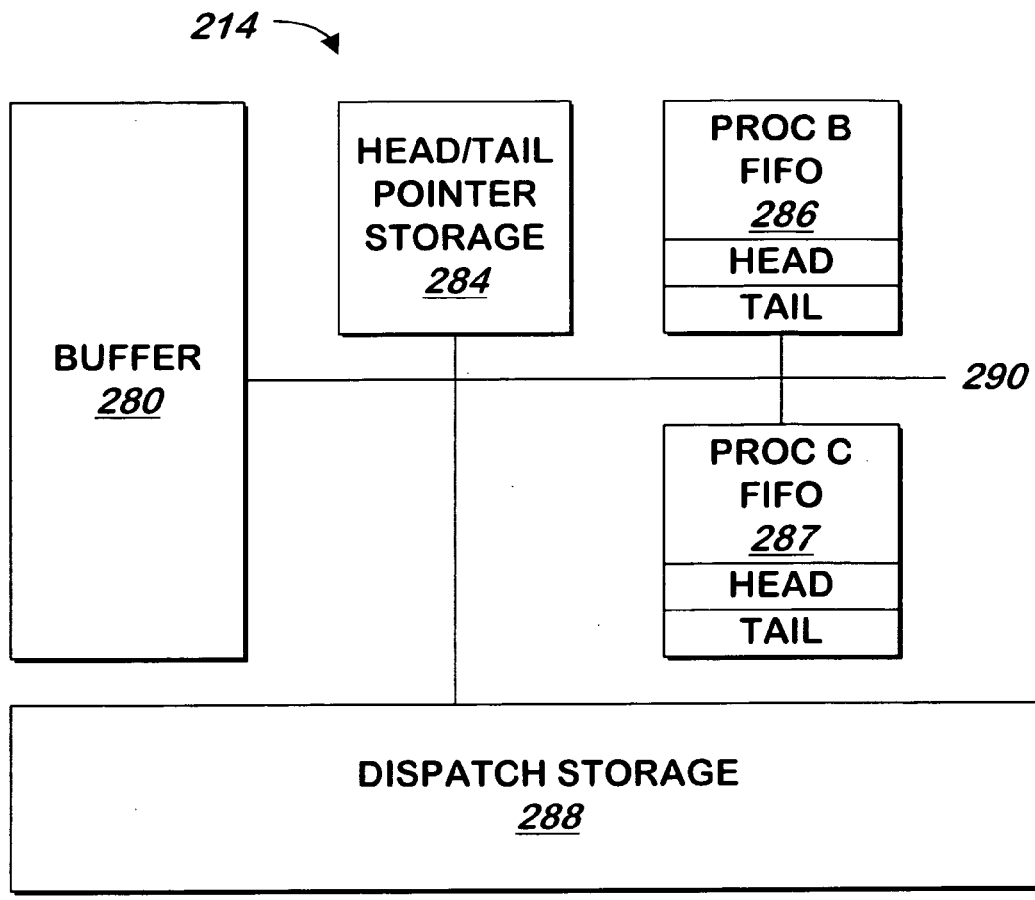
FIG. 2B is a block schematic diagram of an incoming dispatch storage 214 of FIG. 2A according to one embodiment of the present invention.

Referring now to FIGS. 2A and 2B, incoming dispatch storage 214 of FIG. 2A is shown in more detail in FIG. 2B according to one embodiment of the present invention. Input/output 290 may be coupled to both incoming interface manager 212 and shared memory interface 218. The remaining elements 280–288 may simply be portions of the storage of incoming/dispatch storage 214 that have a specific function as described below. A portion of incoming/dispatch storage 214 is set aside for use as the conventional double circular buffer into which some or all of each communication is stored as described above. The address of the head of the buffer is stored in head/tail pointer storage 284 along with the tail, which are used as will now be described. When a communication is received by incoming interface manager 212, it stores some or all of the communication as a block into the buffer beginning with the location specified by the tail pointer as described above. The tail pointer may be an address or an offset or any other identifier that could be used to calculate a location of buffer 280. Incoming interface manager 212 then updates the tail pointer to point to the address after the last byte stored in buffer 280.

In the embodiment of FIG. 2B, the buffer 280 is treated as having a circular arrangement with the lowest numbered byte considered to immediately follow the highest numbered byte in the buffer 280. When information interface manager 212 reaches the end of the buffer 280, it continues storing at the beginning of the buffer 280. If the last byte for a communication stored is at the end of the buffer, the next storage location in the buffer will be the lowest numbered address in the buffer 280 and so incoming interface manager 212 stores that address as the new tail in head/tail pointer storage.

Information is read from the head of the buffer 280 as pointed to by a head pointer in head/tail pointer storage 284. The device reading the information from the head of the buffer adjusts the head pointer to the address in buffer 280 corresponding to start of the next block of data to be read. In one embodiment, the size of each block is stored in the first one or more bytes of the block by incoming interface manager 212 and used to read the next block and adjust the head pointer. In another embodiment, each block of data has a fixed size, so no size is stored with the block.

As described herein in one embodiment, one of the processors 230–234 reads blocks of data and routes them among the other processors 230–234 excluding or including the processor performing the routing function. For purposes of example, processor A 230 will be described as performing this function, and processor A 230 routes the blocks to processors B and C 232, 234. In another embodiment, the routing function described below may be performed by incoming interface manager 212 as it stores the blocks into buffer 280. In still another embodiment, a single processor is used or used to process the blocks received and so no routing function is performed. Processors 230–234 may be the same as CPUs 182–186 of FIG. 1B or may be different from those CPUs.

Processor A 230 reads the communication stored beginning at the pointer to the head of the buffer 280, such head pointer being stored in head/tail pointer storage 284. This may be performed by reading the head pointer in head/tail pointer storage 284, internally storing a copy of the head pointer, reading from buffer 280 the block indicated by the head pointer and updating the head pointer in head/tail pointer storage 284 to point to the next block in one embodiment as described above. In another embodiment, shared memory interface 218 handles the details of maintaining buffer 280 and head pointers and reading at the proper location of buffer 280: processor A simply reads from a specific block and the next block in buffer 280 is provided by shared memory interface 218, which updates the head in head/tail pointer storage 284.

Processor A 230 assigns the block to a processor 232–234 that will process the communication. In one embodiment, as part of this assignment, processor A 230 compares some or all of the block to entries in dispatch storage 288 and if a corresponding entry is located, processor A 230 assigns the block to a processor 232–234 indicated in the entry in dispatch storage that corresponds to the block as described in more detail below.

Figure 2C:
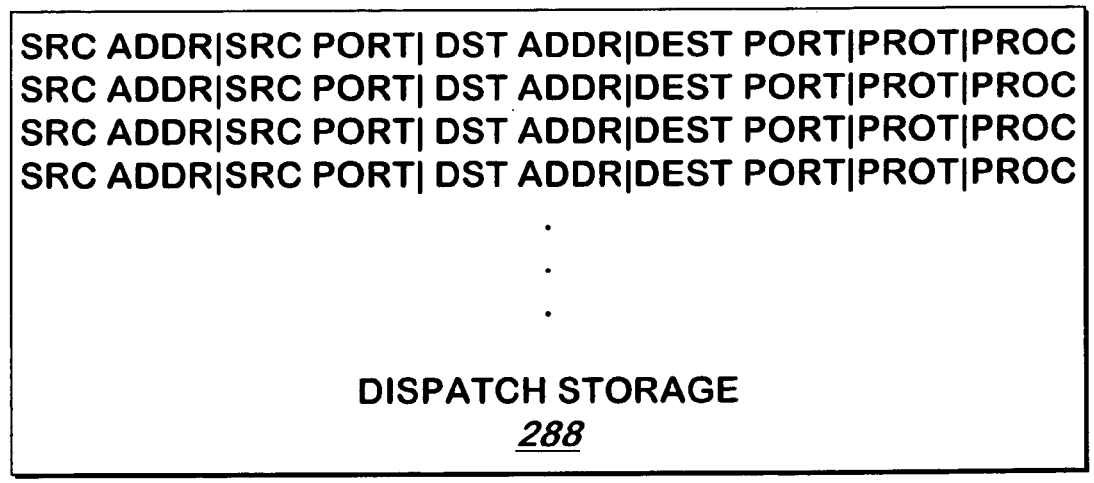
FIG. 2C is a block schematic diagram of a table of entries stored in a dispatch storage 288 of FIG. 2B according to one embodiment of the present invention.

For example, if the blocks in buffer 280 are TCP packets, each block will contain a TCP header of the packet. The TCP header may be used to determine which processor 232–234 should process the packet. When a packet is assigned to a processor 232–234 as described in more detail below, the source IP address, source port, destination IP address, destination port and protocol from the block may be copied by processor A 230 from the TCP header portion of the block into an entry in a table of entries stored in dispatch storage 288 of FIG. 2B along with an identifier of the processor to which the packet is assigned as described below. A representative table of entries is shown in FIG. 2C. When processor A 230 retrieves another block from buffer 280, processor A 280 compares the source IP address, port, destination IP address, destination port and protocol from the packet header of the block read from buffer 280 with the entries in the table in dispatch storage 288 and if a matching entry is located, the communication is assigned to the processor 232–234 listed in the matching entry in dispatch storage 288.

If no matching entry is found, the block may be assigned to a processor 232–234 by random selection, round-robin selection, in which blocks are assigned to processors using a repeating order of the processors, or may be assigned to the processor 232–234 that has the shortest queue of pending communications waiting to be processed (as described in more detail below) or may be assigned using other forms of load balancing.

The block may be assigned to a processor using other criteria. For example, in another embodiment, only the destination IP address of the packet header in the block is used to assign the packets to a processor 232–234. For example, if processor B 232 handles communications to one IP address and processor C handles 234 communications to two other different IP addresses, the entries in dispatch storage 288 may include the destination address and processor identifier and may be preassigned, and not dependent on an earlier assignment. Processor A 230 will match the destination IP address with an entry in the table and assign the packet to the processor having the matching entry, but need not add an entry to the table in dispatch storage 288. In one embodiment, two tables are used. A first one relating destination IP addresses to processors as described above in this paragraph, and a second one relating source and destination IP addresses and ports as well as protocols to processors as described earlier. If the destination address from a block being assigned is not located in the first table, the second table is used as described above to identify a processor to which the block should be assigned or a new entry is added into the second table as described above.

To complete the assignment of a communication to a processor 232–234, processor A 230 places the pointer it copied from head/tail pointer storage 284 into processor B FIFO 286 or processor C FIFO 287 depending on whether the assignment was made to processor B 232 or processor C 234, respectively. The block itself may remain in buffer 280, although in another embodiment, processor A 230 moves the block itself into Processor B FIFO 286 or processor C FIFO 287 instead of the pointer or moves the block to a different buffer (not shown) that may be shared or dedicated to a processor and inserts into FIFO 286 or 287 a pointer to the block in this buffer. In the embodiment in which a buffer is not dedicated to the processor, processor B FIFO 286 and processor C FIFO 287 are arranged as conventional double buffers with a head and a tail pointer (in a reserved location of each respective FIFO 286, 287 not used to write pointers or blocks as shown in the Figure) pointing to the head and tail of the FIFO and processor A 230 moves either the appropriate pointer or the block to the tail of the FIFO 286, 287 and updates the tail to the next available location in the FIFO. If a buffer is dedicated to each processor is used, head and tail pointers are used to point to the head and tail of the buffer itself, with the buffer acting as the FIFO in a double buffer arrangement as described above.

In the embodiment in which processor A 230 assigns the block to the processor having the shortest queue, processor A 230 may determine which queue is shortest by comparing the difference between the head and the tail of each FIFO 286, 287 and choosing the processor 232–234 corresponding to the FIFO having the smallest difference.

As described above, one incoming communication interface and one incoming interface manager feeds one incoming dispatch storage and is coupled to the memory bus via shared memory interface 218. However, any number of these in any ration to one another may be used in other embodiments of the present invention.

C. Processing.

Processors 232–234 monitor their respective FIFOs and when the head and tail are not pointing to the same position, retrieve either the block at the head of the FIFO 286, 287 or the block in buffer 280 pointed to by the head of the respective FIFO 286, 287, (or in another FIFO as described above) and then advance the head of the respective FIFO 286, 287 past the end of the pointer or block stored in the respective FIFO 286, 287. In another embodiment, each processor 232, 234 reads from a fixed location of shared memory interface 218 and receives any block corresponding to the pointer at the head of the FIFO 286, 287 corresponding to the location from which the block was read. If the block is not empty, processor 232, 234 processes the block as described below. In such embodiment, shared memory interface 218 supplies the block from the buffer 280 and manages the head and tail of the FIFOs 286, 288.

Each processor 232 or 234 then processes the block it retrieves and may optionally provide a response to the block. If the block is a request for a web page, processor 232 or 234 retrieves or generates the web page and provides it as described in more detail below. If the communication is a request for some or all of a file stored on a drive, processor 232 or 234 retrieves and provides some or all of the file.

The assignment and retrieval process described above can operate entirely as a memory operation via the shared memory of the computer system. Because each of the processors 230–234 have access to the shared memory, no complex interprocessor communication is required.

Figure 2D:
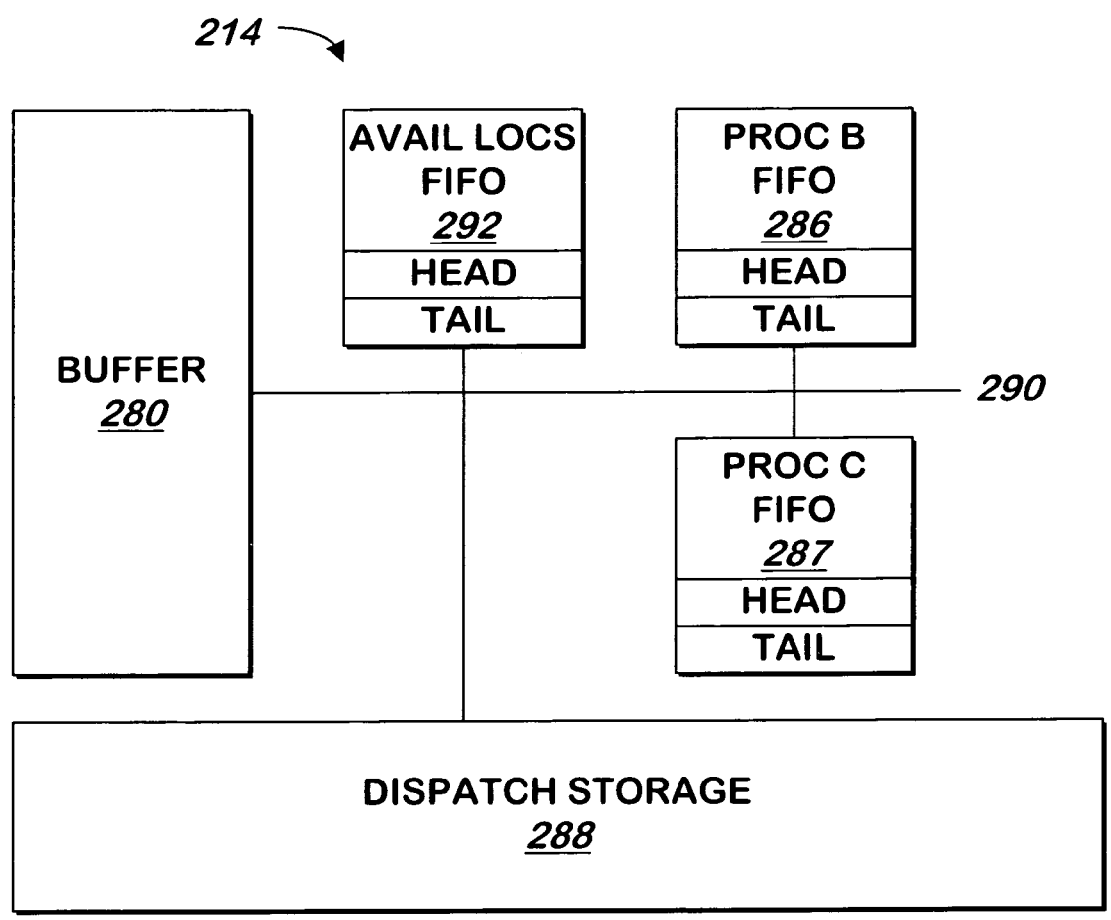
FIG. 2D is a block schematic diagram of an incoming dispatch storage 214 of FIG. 2A according to another embodiment of the present invention.

In one embodiment, incoming dispatch storage 214 has the arrangement shown in FIG. 2D. In such embodiment, instead of head/tail pointer storage 284, available locations FIFO 292 is employed. Buffer 280 need not be arranged as a circular buffer. Instead, buffer 280 contains fixed-length blocks, and pointers to each such block are initialized into available locations INFO 292, which is arranged as a circular buffer with pointers to the head and tail of the INFO 292. (All initializations of incoming dispatch storage 214 may be performed by incoming interface manager 212 on power on or reset.) When incoming interface manager 212 receives a communication, it extracts the portion to be saved as a block and retrieves from available locations FIFO 292 the pointer to buffer 280 pointed to by the head of available, locations FIFO 292, stores the block at the location corresponding to the pointer removed, and advances the head of available locations FIFO 292 to point to the next location in available locations INFO 292. If incoming interface manager 218 routes the block as described above, the pointer removed is placed at the location of processor B FIFO 286 or processor C FIFO 287 indicated by the respective FIFO's tail corresponding to the processor 232, 234 to which the block was assigned.

If one of the processors 230–234 assigns the block to a processor, an additional FIFO (not shown) may be used that is arranged as FIFOs 286 and 287 described above, and incoming interface manager 212 places the pointer it retrieves from available locations FIFO 292 onto the additional FIFO at the location indicated by its tail and advances the tail. Processor A 230 assigns blocks by retrieving them from the head of the additional FIFO, advancing its head, and then adding the pointer to the tail of the FIFO 286, 287 corresponding to the processor to which the block was assigned as described above.

When a processor 232, 234 retrieves for processing the block pointed to by the pointer to the buffer 280 at the head of its respective FIFO 286, 287 it places the pointer at the location pointed to by the tail of available locations FIFO 292 and advances the tail to the next location in the FIFO, signaling that the block in buffer 280 may now be reused.

D. Output.

To generate output to an external system, processor B 232 and processor C 234 write any response to the block to their respective private memory interface 250 or 260, each providing a conventional memory interface to the private memory bus of processor B 232 and processor C 234, respectively, of front side bus 220. Private memory interfaces 250, 260 each pass the response received to a location in a buffer at the tail of outgoing storage B and C 252, 262, respectively. Each outgoing storage 252, 262 is a conventional storage device, such as memory or disk storage, arranged as a conventional double buffer, with a head and a tall as described above with respect to FIFOS 286, 288. As will be described below, it is not necessary to utilize separate outgoing storages 252, 262 as a single outgoing storage can be used, with each private memory interface 250, 260 writing into the single outgoing storage 252 or 262, although it can simplify the circuitry to have individual outgoing 252, 262 to avoid contention issues. The responses are written in blocks having a fixed or variable length as described above. In one embodiment, each processor 232, 234 writes to a single memory location, and the respective private memory interface 250, 260 manages placing it into a buffer in the respective outgoing storage 252, 262 and updating the respective tail pointer. In another embodiment, each processor 232, 234 reads the tail in the respective outgoing storage 252, 262 and stores the response or other communication into the private memory buffer location in the respective outgoing storage 252, 262 indicated by the tail pointer in the respective outgoing storage 252, 262, and updates the tail pointer.

Outgoing storages 252, 262 are monitored by one or more outgoing interface manager 254, 264. Each outgoing interface manager 254, 264 checks the head and tail pointer for the outgoing storage 252, 262 it is monitoring, and if they are different, it takes the block indicated by the tail pointer in outgoing storage 252, 262 in a manner similar to that described above for FIFOs 286, 287, provides the block to an outgoing communication interface 256 or 266 described in more detail below, and updates the tail pointer in the respective outgoing storage 252, 262 to point to the next block in that outgoing storage 252, 262.

Outgoing storages 252, 262 are monitored by one or more outgoing interface manager 254, 264. Each outgoing interface manager 254, 264 checks the head and tail pointer for the outgoing storage 252, 262 it is monitoring, and if they are different, it takes the block indicated by the tail pointer in outgoing storage 252, 262 in a manner similar to that described above for FIFOs 286, 287, provides the block to an outgoing communication interface 256 or 266 described in more detail below, and updates the tail pointer in the respective outgoing storage 252, 262 to point to the next block in that outgoing storage 252, 262.

Outgoing communication interfaces 256, 266 provide at their respective outputs 258, 268 a communication corresponding to each block it receives. Outgoing communications interfaces 256, 266 provide such in a proper protocol and encapsulation, such as TCP/IP messages for the Internet coupled to outputs 258, 268 or TCP/IP messages in Ethernet frames to an Ethernet coupled to outputs 258, 268.

The blocks are thus provided/output "directly" and "sineinterruptusly", meaning, the I/O buses of the computer system with which the system 200 serves are not used nor do interrupts to the system processors result from the output of the communications containing the blocks. Again, conventional 2 port or multi port RAMs as described above may be used for outgoing storage 252, 262, and in such embodiment, the blocks are provided "sinebusly", without the use of the main memory buses as described above.

It is not necessary for each outgoing interface manager 254, 264 to take blocks only from its respective outgoing storage 252, 262 as either outgoing interface manager 254, 264 may take blocks from either outgoing storage 252, 262. Furthermore, it is not necessary for a one to one relationship of outgoing communication interfaces 256, 266 to outgoing interface managers 254, 264 as any relationship of any number to any number may be used. Furthermore, a common set of outgoing storage may be used in place of outgoing storages 252 and 262. Dashed lines in the Figure are indicated to show connections in alternative embodiments.

E. Removal of Entries from Dispatch Storage.

In one embodiment, entries are removed from the table in dispatch storage 288. In one embodiment, each entry is timestamped and a removal process is run periodically to remove an entry based on the timestamp as described in more detail below. The periodic removal process may be run by the processor that performs the routing function, such as processor A 230, a different processor 232, 234 or by incoming interface manager 212.

Each entry may be timestamped in incoming/dispatch storage 214 before, during or after the time that any assignment is made by processor A 230 or incoming interface manager 212 using that entry, or when the entry is added to the table, as described above. In another embodiment, the timestamping is performed by the processor 232, 234 processing the block before, during or after such processing. The timestamp may be the current time and/or date or an expiration time and/or date in the future, and the periodic removal process periodically deletes entries older than a certain amount past the timestamp or any entries past the expiration time. In one embodiment, the expiration time is closer to the current time if the block contains an indication that it is the end of a set of one or more communications, such as a TCP packet with a FIN flag set, and the expiration time is farther from the current time otherwise. If the timestamp indicates the current time, the entry may be marked with an indicator that such an "end of a set of one or more communications" indication was received, and processor A 230 removes such entries having a timestamp older than the current time less a period which is shorter than those not having such an indication. Preassigned entries in dispatch storage described above need not be timestamped or removed.

E. Method.

Figure 3:
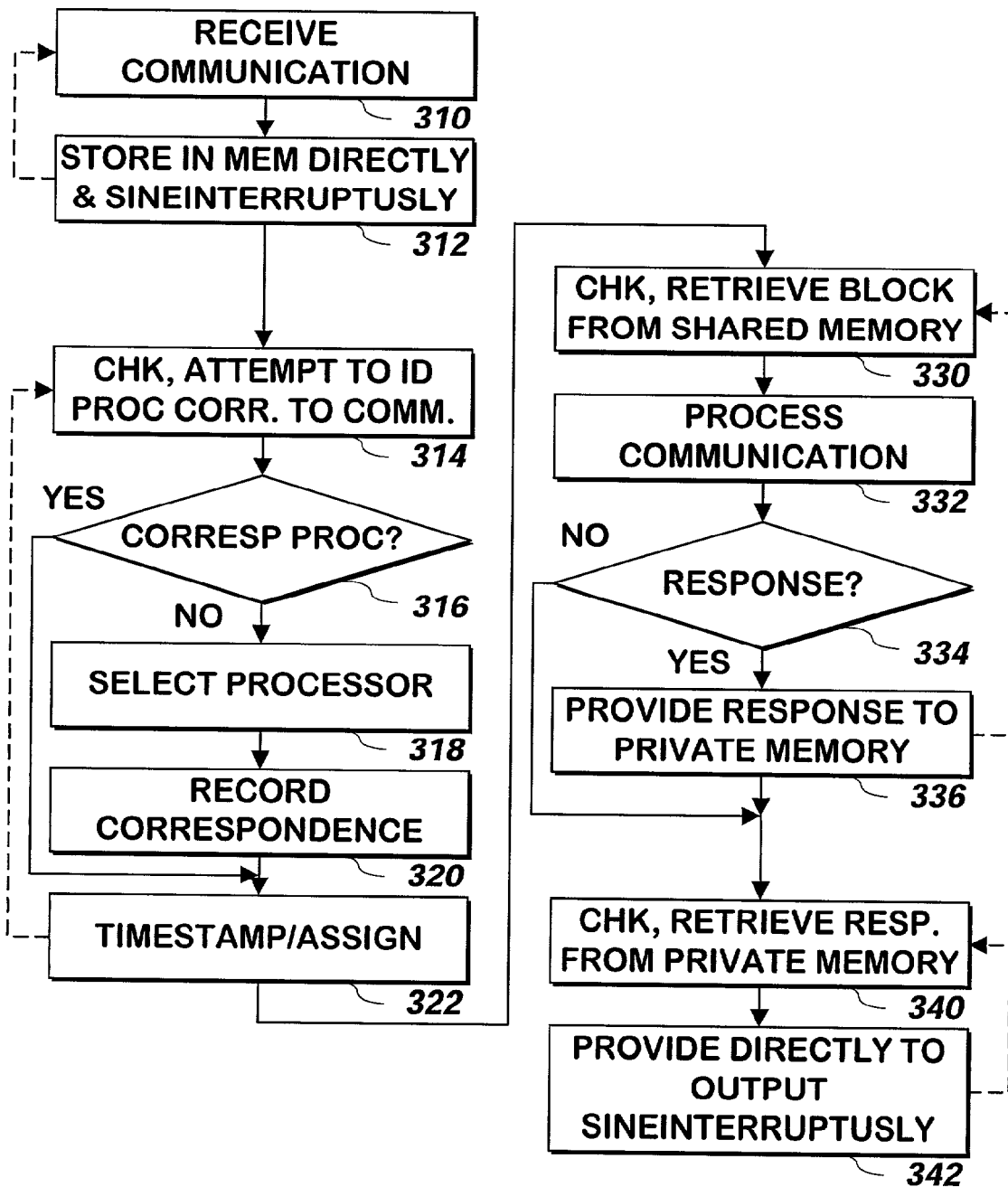
FIG. 3 is a flowchart illustrating a method of processing input/output of a computer system according to one embodiment of the present invention.

Referring now to FIG. 3, a method of processing input/output of a computer system is shown according to one embodiment of the present invention. A communication is received 310. Some or all of the communication is stored 312 "directly" in memory "sineinterruptusly", as those terms are defined above.

If there are multiple processors in the computer system, steps 314–320 are performed, and otherwise, they may be skipped. At step 314 the memory is checked to identify whether any communications have been received but not assigned to a processor as described above and an attempt is made to identify a processor corresponding to the communication stored in step 312. This attempt may include attempting to locate an entry in a table of entries for which a portion or all of the entry matches a portion or all of the communication stored.

If a corresponding processor is not identified 316, a processor is selected 318 as described above and a correspondence between the selected processor and the stored communication may be recorded 320, for example by generating an entry into a table as described above. The entry may be timestamped 322 as described above and assigned to the processor identified either in step 314 or in step 320.

Storage such as shared memory is checked for a communication and if a communication is waiting to be processed, it is retrieved 330 from the storage. The communication is processed 332 as described above. If a response or other communication is to be generated as a result of the processing step 332 334, the response or other communication is provided 336, for example by providing it into storage such as private memory and the method continues at step 340, and otherwise 334, the method continues at step 340.

At step 340, storage such as private memory is checked to identify if any communications have been written as described above, and if so, they are retrieved 340 and provided "directly" from private memory and "sineinterruptusly", and optionally "sinebusly", as those terms are defined above. Shared memory may be used in place of private memory in steps 336–342 in another embodiment of the present invention.

Each set of steps 310–312, 314–322, 330–336 and 340–342 may be implemented as separately running processes that repeat among each set of steps as indicated by the dashed arrows in the Figure.

Although the description above assigns communications to one of multiple processors, in one embodiment, the communications are assigned to one of several processes running on the same or different processors. In other embodiments, communications may be assigned to entities other than processors and processes.

What is claimed is:

1. A method of processing a communication in a computer system having at least one input interface and at least one output interface for respectively receiving a communication and outputting the communication after processing, the method comprising:
   providing at least a first and a second central processing unit (CPU) coupled to respective first and second private memories, the first and second CPUs capable of executing one or more processes under control of an operating system, each process operative to generate at least a portion of a response to the communication;
   configuring a communications interconnection mechanism for operatively linking the CPUs, a shared memory, the input interface, the output interface and a system I/O bus for data communication there between;
   receiving the communication at the input interface;
   directly storing the communication received in the shared memory using the communication interconnection mechanism and independently of the system I/O bus;
   providing the communication stored in the shared memory directly to at least one of the first and second CPUs over the communication interconnection mechanism without causing an interrupt of the operating system and independently of the system I/O bus;
   executing at least one of the one or more processes on at least one of the first and second CPUs to generate at least a portion of the response to the communication;
   receiving the generated portion of the response to the communication from the at least first and second CPUs in the respective private memories associated with each of the first and second CPUs;
   storing in an outgoing storage the response comprising the portion of the responses generated at each of the first and second CPUs; and
   providing the response directly to the output interface without causing an interrupt to the operating system and independently of the system I/O bus.

2. The method of claim 1 wherein:
   the communication is stored in the shared storage accessible to the first and second CPUs;
   the response is stored in one of the first and second private memories in accessible by the one of the first and second CPUs being coupled to the other one of the first and second private memories; and
   the response is provided from the one of the first and second CPUs.

3. The method of claim 2:
   additionally comprising assigning the communication received to at least one of a plurality of queues in the shared memory, the plurality of queues each corresponding to a different one of the first and second CPUs; and
   wherein the providing the communication step comprises providing the communication to at least one of the first and second CPUs corresponding to the at least one queue to which the communication was assigned.

4. The method of claim 3, wherein the assigning step is responsive to a prior communication.

5. The method of claim 3 wherein the assigning step is responsive to information contained in the communication.

6. The method of claim 1 wherein the response is additionally provided independently of the communication interconnection mechanism and the system I/O bus.

7. The method of claim 1 wherein the communication comprises a packet.

8. The method of claim 1 wherein the communication comprises an Ethernet frame.

9. The method of claim 1 wherein the communication comprises a storage device communication.

10. A system for processing a communication, comprising:
   an incoming communication interface having an incoming communication interface input and an incoming communication interface output, the incoming communication interface input operative for receiving the communication, the incoming communication interface output operative for providing at least a portion of the communication received at the incoming communication interface input;
   a plurality of central processing units (CPUs) wherein each CPU is coupled to a private memory for exclusive access by the CPU and wherein each CPU is configured to run a process that executes in an operating system environment to generate at least a portion of a response communication;
   a first storage operatively connected to an incoming interface manager and a shared memory interface, the shared memory interface communicatively coupled to the plurality of CPUs via a communications interconnection mechanism, the incoming interface manager having an input coupled to the incoming communication interface output, the incoming interface manager operative for directly storing the communication received at the incoming interface manager input into the first storage independent of CPU intervention, the shared memory interface operative to provide shared access to the shared memory by the plurality of CPUs using the communications interconnection mechanism for retrieving at least a portion of the stored communication from the first storage and for providing the retrieved communication to at least one of the plurality of CPUs;
   a plurality of second interfaces, each of the plurality of second interfaces corresponding and coupled to a unique one of the plurality of CPUs and having a second interface input for receiving a response to the communication from the unique one of the plurality of CPUs and a second interface output for providing the response to a second storage coupled to the second interface output; and
   an outgoing interface manager communicatively coupled to an outgoing interface manager input/output and an outgoing communication interface the outgoing interface manager input/output being coupled to the second storage, the outgoing interface manager adapted for retrieving the response directly from the second storage without causing an interrupt to be generated in the operating system environment and providing the response at the outgoing communication interface.

11. The system of claim 10, wherein:
   the second interface input coupled to at least one of the plurality of CPUs but coupled to fewer than all of the plurality of CPUs.

12. The system of claim 11, wherein:
   the incoming interface manager is additionally for assigning the communication received to at least one of a plurality of queues in the first storage, the plurality of queues each corresponding to a different one of the plurality of CPUs; and
   and wherein the first interface provides the communication by to at least one of the plurality of CPUs corresponding to the at least one queue to which the communication was assigned.

13. The system of claim 12, wherein the incoming interface manager assigns the communication responsive to a prior communication.

14. The system of claim 12 wherein the incoming interface manager assigns the communication responsive to information contained in the communication.

15. The system of claim 10 wherein the outgoing interface manager additionally retrieves the response from the second storage sinebusly.

16. The system of claim 10 wherein the communication comprises a packet.

17. The system of claim 10 wherein the communication comprises an Ethernet frame.

18. The system of claim 10 wherein the communication comprises a storage device communication.

19. A computer system comprising:
   at least one main processing unit including at least one private memory and at least one process, the private memory adapted to provide dedicated access to the at least one main processing unit, the process configured to execute under control of an operating system and processing at least a first portion of a communication received by the computer system into at least a portion of a response for storage in the at least one private memory;
   an incoming shared memory operatively coupled to an input interface and a shared memory interface, the shared memory interface operatively coupled to the at least one main processing unit via a communications interconnection mechanism, the input interface operative to receive and store at least a portion of the communication in the incoming shared memory independently of the communications interconnection mechanism and independently of the operating system, the incoming shared memory operative to arbitrate shared access to the portion of the stored communication by the at least one main processing unit independently of the input interface and unaccompanied by an interrupt to the operating system; and
   an outgoing shared memory operative to retrieve and selectively output the portion of the response form the private memory independently of the communications interconnection mechanism and unassisted by the operating system.

20. The computer system of claim 19 wherein the at least one main processing unit includes at least two central processing units (CPU)s configured for inter-processor communication over the communications interconnection mechanism.

21. The computer system of claim 19 wherein the incoming shared memory is a multi-port RAM capable of supporting concurrent write and read memory operations by the input interface and the shared memory interface respectively.

22. The computer system of claim 19 wherein the input interface comprises a direct memory access (DMA) controller.

23. The computer system of claim 19 further including software logic operative to generate software pointers that organize the incoming shared memory for writing to and reading from by the input interface and the shared memory interface respectively.

24. The computer system of claim 23 wherein the organized incoming shared memory has a circular buffer architecture.

25. A computer system comprising:
   an input interface operably coupled to a communications transferring medium to receive an input communications therefrom;

a shared memory coupled to the input interface and having a predefined number of physical storage locations for storing the input communications therein;

a memory map comprising updateable software pointers including a first portion of the software pointers that allocate at least a first portion of the physical storage locations for write operations and a second portion of the software pointers point to at least a second portion of the physical storage locations for read operations;

one or more processing units wherein each processing unit is operatively coupled to a private memory for exclusive use by the processing unit and configured to execute a process in a first operating system environment; and a communications interconnection mechanism operably coupled to the one or more processing units and the shared memory via a shared memory interface, the communications interconnection mechanism operative to at least partially enable interprocessor communication and shared access to the shared memory by the one or more processing units wherein the input interface is adapted to perform the write operations and optionally update the software pointers, the one or more processing units configured to perform the read operations arbitrated by the shared memory interface such that each processing units reads input communications stored in non-overlapping regions of the second portion of the physical storage locations for processing into a response written to the private memory via the process associated with the processing unit, the memory map characterized in that the first portion of the physical storage locations for write operations include physical storage locations devoid of input communications or storing input communications that have been read as a result of the read operations wherein the read and write operations avoid generating an interrupt to the first operating system environment and avoid inter-processor communication.

26. The system of claim 25 wherein the memory map is a circular buffer.

27. The system of claim 25 wherein the shared memory is a two port memory with a first port configured for read operations and a second port configured for write operations.

28. The system of claim 25 wherein portions of the input communications are associated with a transmission related characteristic that is related to a pre-assigned designator of a first one of the one or more processing units and wherein the portions of the input communications that match a pre-assigned designator are stored or retrieved as one or more units for processing by the associated processing unit.

29. The system of claim 25 wherein the communication interconnection mechanism is a system bus.

30. A method for processing a communication in a computer system comprising the steps of:

providing an input interface to a communications medium;

coupling a shared memory to the input interface, the shared memory including one or more physical storage locations;

operatively coupling a plurality of processors and a plurality of private memories to a communications interconnection mechanism and coupling the communications interconnections mechanism to the shared memory to enable the plurality of processors to share access to the shared memory and enable each processor dedicated access to one of the plurality of private memories;

providing each processor with a process running under a first operating system;

updating a set of software pointers to at least a portion of the physical storage locations so that a portion of the shared memory is organized as a circular buffer;

receiving an input communication and storing it directly into the circular buffer at a first tail location of the circular buffer;

transferring the input communication at a head of the circular buffer to one of the processing units;

executing the process to generate a response communication based upon the input communication transferred to the processing unit; and storing the response in the private memory associated with the processing unit for transmission to the communications medium.

31. The method of claim 30 wherein the step of storing the response in the private memory further includes:

providing an output shared storage for retrieving and organizing the response from the private memory into an output communication; and transmitting the output communication to the communications medium.

32. A method for responding to an incoming communication comprising:

providing a plurality of processes executing under an operating system hosted by one or more central processing units (CPUs) wherein each CPU is coupled to a private memory for exclusive access by the CPU and each process is capable of generating a response by processing at least a portion of the incoming communication;

operatively coupling a system memory via a communications interconnection mechanism to the one or more CPUs and to an input interface adapted to receive the incoming communication;

generating and storing in hardware a plurality of software pointers allocating at least one writable location for writing to and at least one readable location for reading from the system memory;

directly writing at least a portion of the incoming communication to the at least one writable location unassisted by the operating system;

selectively allowing one of the plurality of processes to directly read at least the portion of the incoming communication from the at least one readable location avoiding interrupt generation to the operating system; and processing the retrieved portion of the incoming communication using the selected process to generate and store a response in the private memory avoiding interprocessor communication between the one or more CPUs.

33. The method of claim 32 wherein the communications interconnection mechanism is a system bus.

* * * * *

UNITED STATES PATENT AND TRADEMARK OFFICE
CERTIFICATE OF CORRECTION

PATENT NO. : 7,228,375 B1
APPLICATION NO. : 10/042971
DATED : June 5, 2007
INVENTOR(S) : Jacobson Page 1 of 1

It is certified that error appears in the above-identified patent and that said Letters Patent is hereby corrected as shown below:

On the cover page, item

[*] Notice: Subject to any disclaimer, the term of this patent is extended or adjusted under 35 USC 154(b) by 828 days Delete the phrase "by 828 days" and insert -- by 826 days --

Signed and Sealed this

Eighth Day of April, 2008

JON W. DUDAS
*Director of the United States Patent and Trademark Office*